Oct. 27, 1931.   A. N. MERLE   1,829,103
LOADING DEVICE FOR VIEW TAKING CINEMATOGRAPHIC APPARATUS
Filed June 9, 1928   2 Sheets-Sheet 1

André Noël Merle
INVENTOR
by Otto Munk
his ATTY.

Oct. 27, 1931.     A. N. MERLE     1,829,103
LOADING DEVICE FOR VIEW TAKING CINEMATOGRAPHIC APPARATUS
Filed June 9, 1928     2 Sheets-Sheet 2
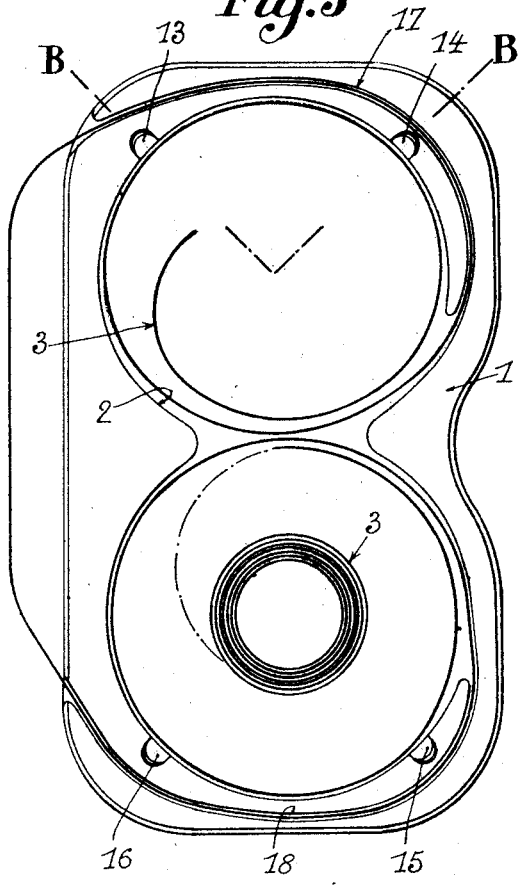
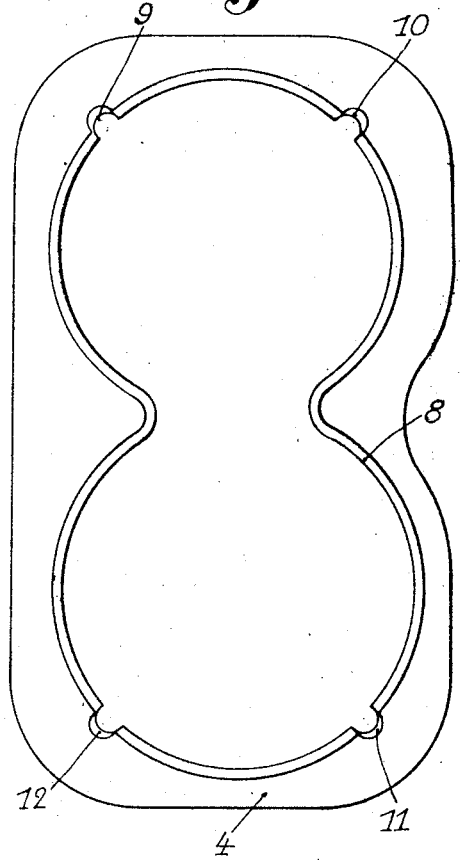
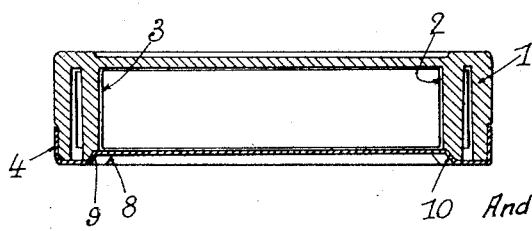
André Noël Merle
INVENTOR Patented Oct. 27, 1931

1,829,103

UNITED STATES PATENT OFFICE

ANDRÉ NOËL MERLE, OF VINCENNES, FRANCE, ASSIGNOR TO PATHE CINEMA, ANCIENS ETABLISSEMENTS PATHE FRERES, OF PARIS, FRANCE

LOADING DEVICE FOR VIEW-TAKING CINEMATOGRAPHIC APPARATUS

Application filed June 9, 1928, Serial No. 284,209, and in France June 23, 1927.

Known types of loading cases or film holders for cinematographic apparatus are in use in which the part of the cover situated above the film-holding chamber is inserted into the said chamber and forms against the periphery of the chamber an oblique wall or bevelled part which cuts off any light that would tend to enter the loading case and thus cause the fogging of the film. However, this bevelled joint is formed on said cover just above the internal surface of the said chamber, so that it will allow a certain play between the oblique or bevelled wall of the cover and the inner wall of the chamber of the loading case. This play, which may be as large as the thickness of the film, will allow the film to enter the space and to become jammed between the two walls.

To obviate this defect, the loading case according to the invention is chiefly characterized in that a bevelled part corresponding to that of the cover is formed on the face of the loading case coacting with the cover, and this bevelled part is situated outwardly of the film-holding chamber. The said bevelled part may extend upon the whole periphery of the said chamber or upon only a certain portion thereof.

The appended drawings show by way of example various embodiments of the invention.

Fig. 3 is an elevational view of a modified form of the loading case according to the invention, with the cover removed.

Fig. 4 is a section on the line B—B of Fig. 3, with the cover in position.

Fig. 5 is an elevational view of the cover alone as viewed from the outer side of said cover.

Figure 1:
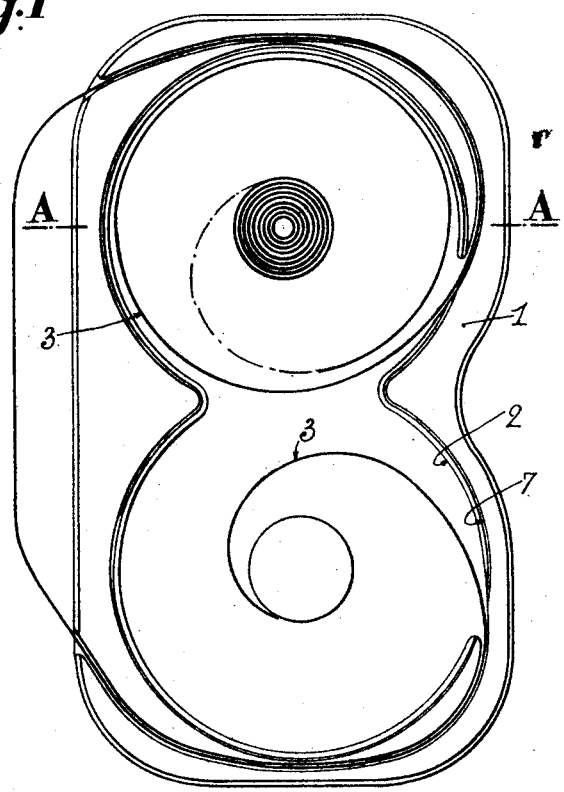
Fig. 1 is an elevational view of a loading case according to the invention, with the cover removed.

The loading case or film holder 1 (Figs. 1 and 2) comprises a chamber 2 adapted to contain the film 3. A cover 4 is placed upon the case 1 of the film-holder. Upon the face of the case upon which the cover is placed, is provided a bevelled part 7 which is placed outwardly of the chamber 2. The cover 4 which carries the bevelled part 5 corresponding to the bevelled part 7, can be fitted into the case 1 and will offer a flat surface upon the whole extent of the chamber 2. The jamming of the film between the case 1 and the cover 4, will thus be impossible with the apparatus shown in Figs. 1 and 2. It should be noted that this arrangement, while it eliminates the cause of the jamming of the film, prevents also the fogging of the film.

Figure 2:
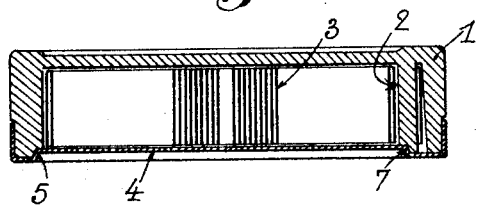
Fig. 2 is a section on the line A—A of Fig. 1, with the cover in position.

It is however observed that the device shown in Figs. 1 and 2 requires the use of a certain width and thickness around the chamber 2 for the proper insertion of the cover, so that if the walls of the case are not sufficiently thick to allow the cover to be inserted without prejudice to the substantial construction of the loading case, the device cannot be practically constructed, as it would comprise certain parts which are of a fragile nature and will also offer little protection against fogging.

To obviate this weakening of the loading case, in the device shown in Figs. 3, 4 and 5, the cover 4 comprises an inclined or bevelled part 8 adjacent the periphery of the chamber 2, and the said cover further comprises local bevelled parts situated at certain points, for instance at the four points 9, 10, 11, 12, as shown in Fig. 5, said bevelled parts projecting on the inner face of the cover and coacting with the respective bevelled cut-out parts or notches 13, 14, 15, 16 of the loading case; said cut-out parts are placed outwardly of the chamber 2 and extend upon only a part of the periphery of said chamber. The points at which the said cut-out parts are situated are suitably located at the places at which the width and thickness of the portion of the box comprised between the chamber 2 and the slot or channel 17 are sufficient to permit this construction. The depressed portion of the cover extends in a same plane as far as the bevelled parts 9, 10, 11, 12 and enters the cut out parts 13, 14, 15, 16 of the case. It is thus imposible for the film to move outwards further than said depressed portion of the cover and consequently to be jammed between the case 1 and the bevelled part 8.

Obviously, the said invention is not limited to the examples herein specified and these are susceptible of numerous modifications without departing from the principle of the invention.

Having now described my invention, what I claim as new and desire to secure by Letters Patent is:

1. A loading case for cinematographic films comprising a hollow box open at one end and having at least one outcut portion formed at said open end in the edge of the inner face of the lateral wall of said box, a cover for said box having its outer portion adapted to bear on the open face of the box and its inner portion depressed and adapted to project into the hollow space of said box, said depressed portion having on its periphery at least one extension whose innermost face is in the same plane as the innermost face of said depressed portion and is adapted to be engaged in said cut out portion, in order to prevent the film to be inserted between said depressed portion and said hollow box.

2. A loading case for cinematographic films comprising a hollow box open at one end and having at least one cut out portion formed at said open end in the edge of the inner face of the lateral wall of said box, a cover for said box having its outer portion adapted to bear on the open face of the box and its inner portion depressed and adapted to project into the hollow space of said box, said depressed portion having on its periphery at least one stopping member whose innermost face is in the same plane as the innermost face of said depressed portion and is adapted to be inserted in said cut out portion, in order to prevent the film to be inserted between said depressed portion and said hollow box.

3. A loading case for cinematographic films comprising a hollow box open at one end and having at least one cut out portion formed at said open end in the edge of the inner face of the lateral wall of said box, a cover for said box having its outer portion adapted to bear on the open face of the box and its inner portion depressed and adapted to project into the hollow space of said box, said depressed portion having at least one projecting part whose innermost face is in the same plane as the innermost face of said depressed portion and is adapted to be inserted in said cut out portion, in order to prevent the film to be inserted between said depressed portion and said hollow box.

4. A loading case for cinematographic films comprising a hollow box open at one end and having a cut out portion formed at said open end along the edge of the inner face of the lateral wall of said box, and a cover for said box having its outer portion adapted to bear on the open face of the box and its inner portion depressed and provided with an innermost flat face adapted both to project into the hollow space of said box and to be inserted in said cut out portion.

In testimony whereof I have signed my name to this specification.

ANDRÉ NOËL MERLE.